Patented Oct. 14, 1930

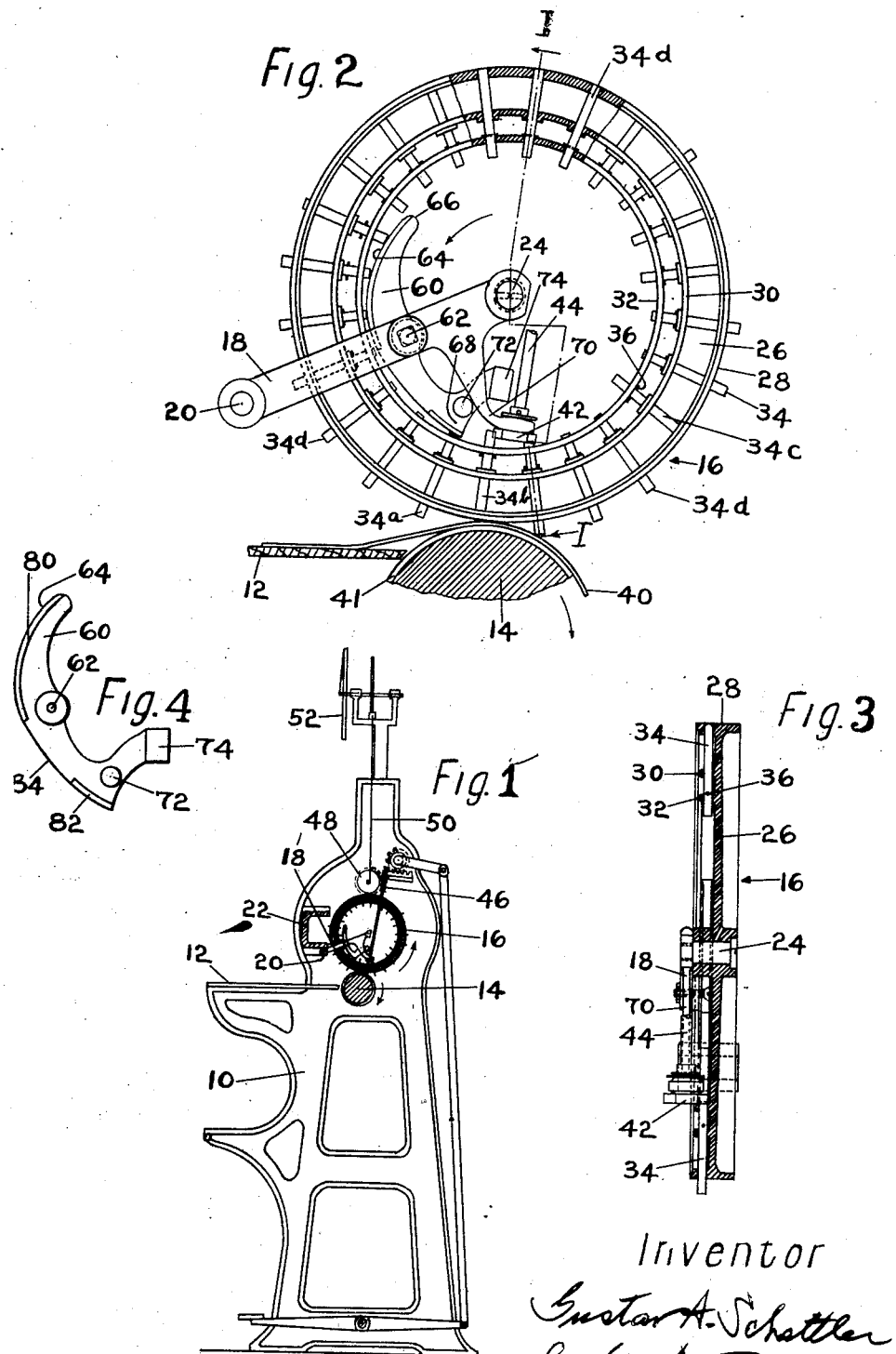

1,778,202

UNITED STATES PATENT OFFICE

GUSTAV ADOLF SCHETTLER, OF BRAMLEY, LEEDS, ENGLAND, ASSIGNOR TO THE TURNER TANNING MACHINERY COMPANY, OF PORTLAND, MAINE, A CORPORATION OF MAINE

MEASURING MACHINE

Application filed June 19, 1926, Serial No. 117,098, and in Great Britain July 1, 1925.

This invention relates to machines for measuring the areas of pieces of sheet material such as leather, paper, cloth and the like, and is illustrated as embodied in a measuring machine of the type shown and described in United States Letters Patent No. 1,046,655, granted Dec. 10, 1912, upon application of G. A. Schettler.

In machines of this type, a feature of the measuring mechanism which contacts with the work resides in the provision of a plurality of measuring wheels each having a number of pins adapted to be positioned under the influence of gravity to contact with the work and to be lifted by the work into position to cause operation of the recording mechanism. When no material is passing under the wheels these pins are not lifted and consequently do not actuate the recording means. It occasionally happens that with certain classes of work the measuring wheels become clogged with dirt some of which may work into the sockets, which hold the pins in the wheel, to such an extent as to prevent the proper operation of the pins. Thus, if one or more pins should become clogged in the wheel and for this reason should fail to drop by gravity at the proper time, the recording mechanism would be operated irrespective of the presence or absence of material beneath the wheel, and in this way an incorrect result would be obtained.

In view of the foregoing, it is an object of the invention to provide a measuring machine so organized as to insure proper operation of the measuring instrumentalities irrespective of the condition of the work or the presence of material tending to clog the measuring mechanism.

To this end and in accordance with important features of the invention, the illustrated machine comprises measuring wheels carrying work-engaging pins together with means for positively moving the pins into position for operation by the work if such be present, thus performing in a positive manner what has heretofore been left to the action of gravity. The pin operating means conveniently, and as illustrated, comprise a plurality of members each of which is arranged to be associated with a measuring wheel and is operative during rotation of the latter to force the pins carried by that wheel to operative position. In the illustrated machine, each pin operating member is a cam mounted upon a support within the periphery of the corresponding wheel and with which the inner ends of the pins successively contact and are thereby pushed outwardly while they are approaching the low point of the wheel during rotation of the latter.

It is important to prevent objectionable reverse movement of the measuring wheels since if such movement were permitted it would be possible to falsify the record of measurement of the material whereby there might be indicated a larger area for any given piece of work than it actually contains. Accordingly an important feature of the invention resides in the provision of means associated with each measuring wheel for engaging with some one of the pins of each measuring wheel for preventing undesirable backward movement of the measuring wheel. Conveniently each cam member, which serves in the illustrated construction positively to move the pins to operative position, is provided at its lower end with a shoulder for engagement with the pin of a wheel which has just been operated by the work in a measuring operation to prevent such undesirable reverse movement of the wheel.

While the invention is especially applicable to machines of the type shown and described in Letters Patent No. 1,046,655, above cited, it will be understood that it is not restricted to embodiment in machines of the illustrated type, but that it may find application and use in other types of machines employing projectable and retractable members.

Other features of the invention and novel combinations of parts will be described in detail in the specification and pointed out in the appended claims.

In the drawings,

Fig. 1 is an end view partly in section of a leather measuring machine illustrating one embodiment of the invention;

Fig. 2 is an enlarged detail view showing a measuring wheel and parts associated therewith;

Fig. 3 is a section along the line I—I of Fig. 2; and

Fig. 4 is a detached view of a member designed for cooperation with certain elements of the measuring wheel shown in Fig. 2.

Referring to the measuring machine shown in Fig. 1 it will be observed that an end frame 10 of the machine and its opposite end frame (not shown) serve as supports for a table 12 over which pieces of work may be moved by the operator into contact with a rotary bed roll 14 supported by the end frames 10. Mounted above the bed roll 14 and resting thereon is a measuring wheel 16, one of a number of such wheels disposed side by side in close juxtaposition to each other throughout the length of the bed roll. Each measuring wheel 16 is held in place by means of a lever 18 pivoted at 20 to a cross bar 22 which serves also to connect the end frames 10. As shown the wheel 16 is rotatably mounted at 24 upon the end of the lever 18. At this point it may be remarked that all of the measuring wheels in the machine are similarly mounted and of a construction similar to that of wheel 16 shown particularly in Figs. 2 and 3. Each wheel 16 comprises a flat, circular portion 26 having a flanged peripheral portion 28 and also other flange portions 30, 32 concentrically arranged with respect to the flange 28. Pins 34 are slidably mounted in sockets alined in the three flanges 28, 30, 32, means being provided for preventing separation of the pins from the wheel 16, the said means in the construction shown comprising small cross pins 36, one located in each pin 34 in that portion thereof which is retained between the flanges 30, 32. When one of the pins, for instance, the pin $34^a$, reaches the position shown in Fig. 2, it is in a position to engage with a piece of work 40. If no work be present, the lower end of the pin $34^a$ will finally engage within a groove 41 of the bed roll 14 so that it will not be projected upwardly as if work were present. Upon engagement of the pin $34^a$ with the work it is gradually moved upwardly during movement of the work so that its lower end becomes level with the periphery of the wheel 16 where the latter is engaged with the work. In this way the upper end of the pin $34^a$ when it reaches the position of pin $34^b$ has its upper end in position to engage with a star wheel 42 pinned for rotation with the shaft 44 so that upon rotation of the star wheel 42 by the pin $34^b$ the shaft 44 is also rotated, and this rotation transmitted through a worm 46 (Fig. 1) to a gear wheel 48 to the hub of which is attached a flexible ribbon 50 arranged to be connected to a lever serving as part of a totalizing mechanism (not shown) which records the movement of each measuring wheel 16, a recording dial being provided at 52 by which the operator is informed of the total measurement of the piece of work passed over the bed roll 14. For a more complete description of the above mentioned parts of the illustrated machine reference should be had to Letters Patent No. 1,046,655 cited earlier in this specification.

As has already been stated it occasionally happens that measuring machines are employed with classes of work or under such conditions otherwise that the measuring wheels become fouled to such an extent even that the pins 34 no longer move freely within the sockets in the flanges 28, 30, 32. If such a pin after being moved up into the position of pin $34^b$ were allowed to remain in that position it would re-engage the star wheel 42 at the end of another revolution of the wheel 16 irrespective of the fact of the presence or absence of work on the bed roll 14, in this way falsifying the record. While it is desirable that the machine should be kept in a clean condition so that the pins 34 may move freely within their sockets and be operated at the proper time, it is distinctly advantageous to provide means to operate the pins positively in case of clogging during the day's run. The reason for this resides in the fact that much time would be consumed in conditioning the machine if attempts were made to clean it during working hours, since the cleaning fluid itself must be thoroughly removed. Otherwise there would be danger of damage to the work by reason of dripping of any unremoved cleaning fluid. In the illustrated construction positive operation of the pins in one direction is accomplished by means arranged to operate upon the inner ends of the pins to cause such a projection thereof as will bring their outer ends to the normal position for engagement with the work. This means comprises, for each wheel, a cam member 60 pivoted at 62 to the lever 18 which serves to position the given wheel 16. Each cam member 60 has a cam surface 64 which has its end 66 spaced from the path of the inner ends of the pins 34 so as not to engage the latter, the curved surface 64 being operative gradually to force the pins 34 outwardly until they are fully projected. It will be observed that the lower end 68 of the cam member 60 is spaced a substantial distance away from the pin $34^b$, thus furnishing a space sufficient to permit the gradual lifting of the pin $34^a$ upon contact with the work 40. Should one of the pins, for instance, pin $34^b$ or $34^c$, remain in pushed-in position after leaving the work due to clogging with dirt, it is projected to operative position, for subsequent contact with the work, during revolution of the wheel 16 by means of the cam member 60. Other pins such as those at $34^d$ are not clogged and thus would move freely by gravity to proper operative position if cam 60 were not present.

Means is provided in the illustrated machine for preventing such reverse rotation of the measuring wheel 16 as would make it possible for the operator to render the record on the dial of the machine incorrect. It is clear that if a measured portion of the work be withdrawn and again fed to the machine, there would be a duplicating of the measurement of this part or portion, causing the dial to record a higher figure than that justified by the actual area of the piece being measured. In the construction shown, the means for preventing such a reverse movement of each measuring wheel 16 comprises a portion 68 of the member 60. In any attempt made by the operator to reverse the measuring wheels 16 the work is tensioned so that it rises nearer to the periphery of the wheels 16 over a larger area than when it is under less tension and thereby affords support for the pins at the position or station of pin 34$^b$ whereby they are retained in position, during reverse movement of the wheels 16, for their upper ends to engage with the locking shoulders at 68 of the members 60, thus terminating the rearward movement of the wheels. Inasmuch as pin 34$^b$ has not operated the star-wheel 42, oscillatory movement of the wheel 16 carrying the pin 34$^b$ (or any other pin at the time between star wheel 42 and shoulder 68) back and forth between the parts 42 and 68 has no effect on the recording mechanism. Hence such reverse movement of wheel 16 as is permitted in the construction shown is not objectionable or undesirable.

In the illustrated preferred construction of the measuring machine each lever 18 has a downwardly projecting arm 70 which serves as a support for the corresponding star wheel 42 which, though pinned to the shaft 44 for rotation therewith, is slidable longitudinally on the shaft and is supported as stated by the arm 70. Advantage is taken of the position of the arm 70 to utilize it as a stop in conjunction with the stud 72 on the member 60 to prevent undesirable oscillation of the latter. To assist in holding the end portion 68 of the member 60 in its operative position in contact with the heads of pins in the position of pin 34$^a$, a weighted portion 74 is formed on the end of the member 60.

Upon reference to Fig. 4 of the drawing it will be observed that the cam member 60 has a flange 80 along its curved edge portion 64 which is adapted to contact with the inner ends of the pins 34 and further that the end 68 of the cam member 60 has a flange portion 82 for contact with the heads of the pins whereby the curved surface of flange 80 on the opposite side of the pivotal mounting 62 is maintained in contact with the pins to force them outwardly to operative position. In between the flanges 80, 82 the member 60 is cut away or formed on a straight line portion, as at 84, so as not to contact with the heads of the pins, thereby minimizing friction. The pivotal mounting of the member 60 is provided so that the member may adjust itself and serve as a pawl at its lower end 68, as already described, for contact with the pins in case of attempt being made to reverse the movement of the measuring wheel 16 for the purpose of causing incorrect measurement of the work.

In the operation of the machine a piece of work, as at 40, is shoved over the table 12 by the operator until it is engaged between the bed roll 14 below and the measuring wheels 16 above. This engagement of the work causes communication of the rotation of the bed roll 14 to the measuring wheels 16 above the work. Then, as each pin 34 comes in contact with the work it is lifted up so that its upper end engages with the corresponding star wheel 42, thereby causing rotation of the shaft 44 whereby measurement of the leather is transmitted through the totalizing mechanism to the dial 52. For insuring proper projection of the pins 34 they are each operated upon in turn by the cam surface 64 of the member 60 located on the side of downward movement of the wheel 16. As before stated, should any attempt be made to withdraw the work the measuring wheel is locked against reverse rotation by engagement of one of the pins 34 with the end 68 of the member 60, thereby preventing any attempt at falsifying the operation of the recording mechanism.

Having described my invention, what I claim as new and desire to secure by Letters Patent is:—

1. In a measuring machine, a measuring wheel, a plurality of pins carried by the wheel to contact with a piece of work to be measured, a recording mechanism arranged to be operated by the pins, and means positively to cause projection of the ends of the pins from the periphery of the wheel at a predetermined point in the rotation thereof.

2. In a measuring machine, a measuring wheel, a plurality of pins carried by the wheel to contact with a piece of work to be measured, a recording mechanism arranged to be operated in successive steps by the pins, and means stationary relatively to the measuring wheel for causing projection of the ends of the pins from the periphery of the wheel at a predetermined point during the rotation of the latter.

3. In a machine for measuring a piece of work, a measuring wheel, a plurality of pins movable along lines extending radially of the wheel to contact with the work and to be operated thereby, and means positively to cause projection of the ends of the pins from the periphery of the wheel at a predetermined point in the rotation thereof.

4. In a machine for measuring hides, skins, leather, or other similar pieces of work, a measuring wheel, a plurality of pins movable along lines extending radially of the wheel to contact with the work and to be operated thereby, and means stationary relatively to the measuring wheel for causing projection of the ends of the pins from the periphery of the wheel at a predetermined point during the rotation of the latter.

5. In a machine for measuring hides, skins, leather, or other similar pieces of work, a measuring wheel, a plurality of pins movable along lines extending radially of the wheel to contact with the work and to be operated thereby, and a member associated with the wheel and having a curved surface operative to cause projection of the ends of the pins from the periphery of the wheel at a predetermined point during the rotation of the latter.

6. In a machine for measuring hides, skins, leather, or other similar pieces of work, a measuring wheel, a support for the wheel, a plurality of pins carried by the wheel for contact with the work during a measuring operation, and a cam member mounted on the wheel support and operative to cause projection of the pins with their outer ends beyond the periphery of the wheel as the pins approach the plane of the work.

7. In a measuring machine, a measuring wheel, a plurality of pins carried by the wheel, and means for engaging a pin at a given station for preventing undesirable reverse movement of the measuring wheel, said means being mounted for movement in the plane of the wheel.

8. In a measuring machine, a measuring wheel, a plurality of pins carried by the wheel for contact with a piece of work to be measured, a recording mechanism arranged to be operated in successive steps by the pins operated upon by the work, and a pivoted member for engaging a pin at a given station for preventing undesirable reverse movement of the measuring wheel, the member being mounted so that its pivotal axis is parallel with the axis of rotation of the wheel.

9. In a measuring machine, a measuring wheel, a plurality of pins carried by the wheel for contact with a piece of work to be measured, a recording mechanism arranged to be operated in successive steps by the pins operated upon by the work, and a member supported within the wheel and operative to engage the inner end of a work-operated pin to prevent undesirable reverse movement of the measuring wheel.

10. In a measuring machine, a measuring wheel, a plurality of pins carried by the wheel for contact with a piece of work to be measured, a recording mechanism arranged to be operated in successive steps by the pins when lifted by the work, and a pivoted member serving as a pawl to engage a lifted pin to prevent undesirable reverse movement of the measuring wheel.

11. In a machine for measuring a piece of work, a measuring wheel, a plurality of pins carried by the wheel movable to contact with the work and to be projected thereby to cause recording of the operation of the measuring wheel, and a single member serving to cause projection of the outer ends of the pins beyond the periphery of the wheel and subsequently to engage a work-projected pin to prevent undesirable reverse movement of the measuring wheel.

12. In a machine for measuring a piece of work, a measuring wheel, a recording mechanism, a plurality of pins slidably mounted in the wheel to contact with the work and to be operated thereby into engagement with the recording mechanism, a member for causing projection of the pins with their ends beyond the periphery of the wheel so positioned that the work may subsequently move the pins in succession into position for engagement with the recording mechanism, and means for preventing undesirable reverse movement of the measuring wheel.

13. In a machine for measuring hides, skins, leather, or other similar pieces of work, a measuring wheel, a recording mechanism, a plurality of pins slidably mounted in the wheel to contact with the work and to be operated thereby into engagement with the recording mechanism, a member for causing projection of the pins with their ends beyond the periphery of the wheel so positioned that the work may subsequently lift the pins in succession into engagement with the recording mechanism, and means carried by said member for engaging with a lifted pin to prevent undesirable reverse movement of the measuring wheel.

14. In a machine for measuring hides, skins, leather or other similar pieces of work, a measuring wheel, a recording mechanism, a plurality of pins slidably mounted in the wheel to contact with the work and to be operated thereby into engagement with the recording mechanism, and a member for causing projection of the pins with their ends beyond the periphery of the wheel so that the work may subsequently move the pins in succession into engagement with the recording mechanism, said member serving also as a lock to prevent undesirable reverse movement of the measuring wheel.

15. In a machine for measuring hides, skins, leather, or other similar pieces of work, a measuring wheel, a plurality of pins carried by the wheel to contact with a piece of work to be measured, a recording mechanism arranged to be operated by the pins, and a member having a curved surface operative to cause projection of the ends of the pins from the periphery of the wheel at a predetermined point during the rotation of the latter, and having a portion to engage a pin to prevent undesirable reverse movement of the wheel and another portion between said pin engaging portion and said curved surface spaced from the path of the pins.

16. In a machine for measuring hides, skins, leather, or other similar pieces of work, a measuring wheel, a recording mechanism, a plurality of pins slidably mounted in the wheel to contact with the work and to be operated thereby into engagement with the recording mechanism, and a member pivotally mounted at a point midway of its length and within the periphery of the wheel so as to be capable of a rocking movement, said member having a cam portion operative positively to eject the pins during rotation of the wheel and having a portion on the other side of the pivotal mounting operative to serve as a pawl to prevent undesirable backward movement of the wheel.

17. In a machine for measuring hides, skins, leather or other similar pieces of work, a measuring wheel, a recording mechanism, a plurality of pins slidably mounted in the wheel to contact with the work and to be operated thereby into engagement with the recording mechanism, and a member having a portion on one side of the pivotal mounting so shaped that by engagement therewith the pins will be moved from an inner to an outer position in the measuring wheel, and having a portion on the other side of the pivotal mounting so shaped that the pins will make contact with it at or near its extremity only whereby the last-mentioned portion serves as a stop for preventing undesirable reverse movement of the measuring wheel.

18. In a measuring machine, a measuring wheel, and a plurality of pins carried by the wheel, in combination with means operative upon reverse movement of the wheel and constructed and arranged to engage a pin which has just been lifted by the work for preventing undesirable reverse movement of the measuring wheel.

In testimony whereof I have signed my name to this specification.

GUTAV ADOLF SCHETTLER.